US011704539B2

(12) United States Patent
Amiri et al.

(10) Patent No.: US 11,704,539 B2
(45) Date of Patent: Jul. 18, 2023

(54) FORECASTING ROUTINES UTILIZING A MIXER TO COMBINE DEEP NEURAL NETWORK (DNN) FORECASTS OF MULTI-VARIATE TIME-SERIES DATASETS

(71) Applicant: Ciena Corporation, Hanover, MD (US)

(72) Inventors: Maryam Amiri, Ottawa (CA); Petar Djukic, Ottawa (CA); Todd Morris, Stittsville (CA)

(73) Assignee: Ciena Corporation, Hanover, MD (US)

(*) Notice: Subject to any disclaimer, the term of this patent is extended or adjusted under 35 U.S.C. 154(b) by 728 days.

(21) Appl. No.: 16/833,781

(22) Filed: Mar. 30, 2020

(65) Prior Publication Data

US 2021/0303969 A1    Sep. 30, 2021

(51) Int. Cl.
*G10L 15/32* (2013.01)
*G06N 3/045* (2023.01)
*G06N 3/08* (2023.01)

(52) U.S. Cl.
CPC .............. *G06N 3/045* (2023.01); *G06N 3/08* (2013.01); *G10L 15/32* (2013.01)

(58) Field of Classification Search
CPC ....... G10L 15/32; G06N 3/0454; G06Q 10/04
See application file for complete search history.

(56) References Cited

U.S. PATENT DOCUMENTS

| 6,735,580 B1* | 5/2004 | Li | G06N 3/049 |
| | | | 706/30 |
| 8,887,217 B2 | 11/2014 | Salem et al. | |
| 9,819,565 B2 | 11/2017 | Djukic et al. | |
| 9,838,271 B2 | 12/2017 | Djukic et al. | |
| 10,015,057 B2 | 7/2018 | Djukic et al. | |
| 10,270,564 B2 | 4/2019 | Djukic et al. | |
| 10,417,556 B1* | 9/2019 | Fairbank | G06N 3/08 |

(Continued)

FOREIGN PATENT DOCUMENTS

| CN | 107102969 A | * | 8/2017 | ........... G06F 17/148 |
| CN | 107103758 A | * | 8/2017 | ........... G08G 1/0129 |
| EP | 3219564 A1 | * | 9/2017 | ............ B60W 10/04 |

OTHER PUBLICATIONS

Kyle Hsu et al., Unsupervised Learning via Meta-Learning, arXiv:1810.02334v6 [cs.LG] Mar. 21, 2019, Published as a conference paper at ICLR 2019, pp. 1-24.

(Continued)

*Primary Examiner* — Feng-Tzer Tzeng
(74) *Attorney, Agent, or Firm* — Clements Bernard Walker; Christopher L. Bernard

(57) ABSTRACT

Deep Neural Networks (DNNs) for forecasting future data are provided. In one embodiment, a non-transitory computer-readable medium is configured to store computer logic having instructions that, when executed, cause one or more processing devices to receive, at each of a plurality of Deep Neural Network (DNN) forecasters, an input corresponding to a time-series dataset of a plurality of input time-series datasets. The instructions further cause the one or more processing devices to produce, from each of the plurality of DNN forecasters, a forecast output and provide the forecast output from each of the plurality of DNN forecasters to a DNN mixer for combining the forecast outputs to produce one or more output time-series datasets.

20 Claims, 7 Drawing Sheets

(56) References Cited

U.S. PATENT DOCUMENTS

| 2006/0120609 A1* | 6/2006 | Ivanov ................. G06V 10/811 |
| | | 382/190 |
| 2009/0018833 A1* | 1/2009 | Kozat ..................... G10L 15/32 |
| | | 704/E15.018 |
| 2016/0112327 A1 | 4/2016 | Morris et al. |
| 2017/0230267 A1 | 8/2017 | Armolavicius et al. |
| 2019/0230046 A1 | 7/2019 | Djukic et al. |

OTHER PUBLICATIONS

Shaoqing Ren et al., Faster R-CNN: Towards Real-Time Object Detection with Region Proposal Networks, Microsoft Research, pp. 1-9.

Kaiming He et al., Mask R-CNN, Facebook AI Research (FAIR), 2017, pp. 2961-2969.

Rob J. Hyndman, Forecasting: principles and practice, 3.3 Hierarchical forecasting, Monash Business School, pp. 1-107.

Cho et al., Supply-Power-Constrained Cable Capacity Maximization Using Deep Neural Networks, Journal of Lightwave Technology (2020).

Contributors, Automatic differentiation with autograd, 2017, https://gluon.mxnet.io/chapter01_crashcourse/autograd.html.

\* cited by examiner

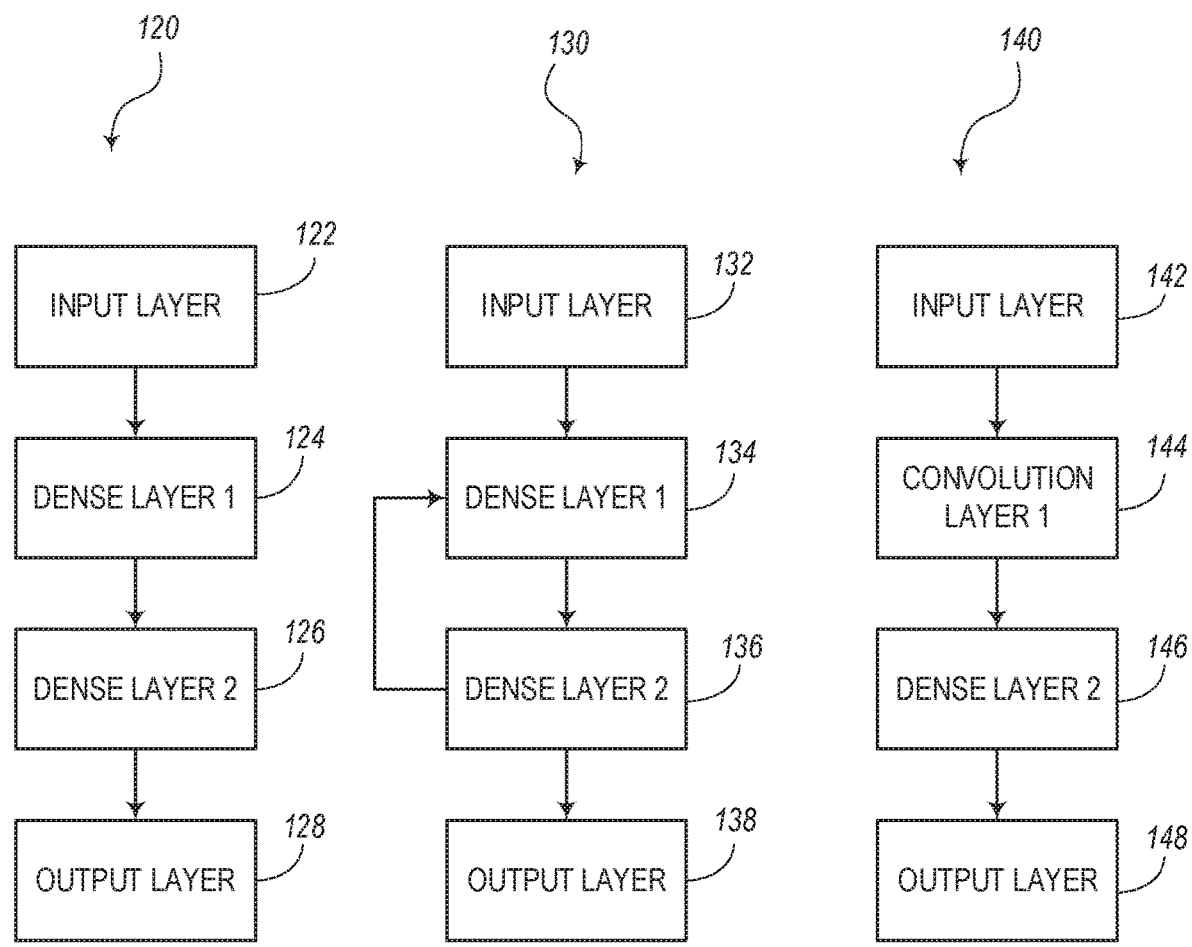

FORECASTING ROUTINES UTILIZING A MIXER TO COMBINE DEEP NEURAL NETWORK (DNN) FORECASTS OF MULTI-VARIATE TIME-SERIES DATASETS

TECHNICAL FIELD

The present disclosure generally relates to forecasting systems and methods. More particularly, the present disclosure relates to a mixer used in a Deep Neural Network (DNN) for mixing multi-variate time-series inputs obtained from a system or environment to forecast a related or unrelated time-series output that predicts future events or data of the system or environment.

BACKGROUND

Forecasting processes are used for making predictions about future conditions of a monitored system. For example, in the environment of the stock market, stockbrokers may utilize forecasting models of the stock market in an attempt to predict future stock prices to determine whether to buy or sell stocks. In the environment of a communication network, as another example, network administrators may utilize forecasting models to predict future conditions of the communication network in an attempt to optimize the network, such as by deploying extra equipment where needed, planning routing paths for data packets, etc.

Since many existing forecasting models are not particularly accurate, a challenge has been created to allow forecasting developers to compete against each other in an attempt to improve forecasting methodologies. The competition, created by Spyros Makridakis in 1982, uses a standard set of forecasting datasets to evaluate each competitor's forecasting algorithms in a standardized manner. In the competition held in 2018 (i.e., the "M4 competition"), the best forecasting algorithm was based on a straight forward use of a residual Deep Neural Network (DNN) with Long Short-Term Memory (LSTM) layers. In addition to the M4 competition, other successful forecasting algorithms have recently been developed, such as a Residual neural Network (ResNet) that has been able to outperform the M4 winner.

Some conventional forecasting models may use a multi-variate approach. These models are typically based on two basic approaches: 1) matrix-based dimensionality reduction techniques, such as Principal Component Analysis (PCA), which is used to reduce the input size to a single-variate time-series, which is then forwarded to a single-variate forecaster; and 2) forecasting multiple time-series datasets independently and then reducing the dimensionality of the output using matrix techniques, such as Vector Auto-Regression (VAR).

It should be noted that the traditional and recently developed approaches use a dimensionality reduction technique. The dimensionality reduction technique applies a matrix with fixed weights to reduce the information from multiple dimensions to a single dimension, meaning that it is not learned specifically for the dataset being forecasted. In effect, these matrices are a "linear" transformation on the input data, which can be configured as a first or second order statistic of the dataset.

The conventional solutions typically exhibit many shortcomings that may be improved upon. First, they use linear transformations of the input data at the reducer. This can only be expected to work if the relationship between time-series can be described as a weighted sum, but in reality, this is usually not the case. Second, the transformation is usually model-based (e.g., sum of Gaussian random variables for PCA, multi-dimensional Auto Regressive Integrated Moving Average (ARIMA) for VAR, etc.). PCA is not dependent on what is in the time-series. The main goal of the PCA reducer is to reduce the dimensionality of the time-series datasets. Also, VAR reduces dimensionality, but does not find the best pieces of information from the forecasts to create a forecast based on this.

Also, the transformations of previous solutions normally treat all instances of the dataset the same way (e.g., by using first or second order statistics). The way that the functions of conventional solutions are created is not through a learning process and thus does not necessarily dependent on a dataset. In a sense, the functions are created from the available data, but it does not learn from the data. Instead, it is a fixed procedure.

Therefore, there is a need in the field of forecasting to provide more effective forecast training methods and forecasting models to overcome the above-mentioned deficiencies of the conventional forecasting models.

SUMMARY

The present disclosure is directed to forecasting systems and methods for looking at historical information that can be obtained from a system or environment (e.g., an optical communication network) and making an accurate prediction of how the system or environment will behave in the future. In particular, the forecasting systems and methods of the present disclosure utilize Machine Learning (ML), such as Deep Neural Networks (DNNs) for accurately learning the forecasting functions. Also, the implementations described herein are configured to obtain historical data from the system/environment. The historical data includes multi-variate datasets (i.e., datasets having two or more types of variables). Forecasts of the historical multi-variate datasets are created, and these forecasts are mixed or combined in a non-linear manner to produce an output dataset. The output dataset may include the same type of parameters as the types of parameters of the one or more of the input datasets. In other words, the type of historical multi-variate data received may include information that is at least partially related to or unrelated to the output data representing a forecast of predicted future values of that particular type of data.

According to one embodiment of the present disclosure, an apparatus includes a processing device and a memory device configured to store a Deep Neural Network (DNN) module having instructions that, when executed, cause the processing device to receive an input at each of one or more DNN forecasters. Each input corresponds at least partially to one or more time-series datasets of a plurality of input time-series datasets. The DNN forecasters each produce a forecast output corresponding at least partially to one or more output time-series datasets. The instructions cause the processing device to also receive a plurality of mixer inputs at a DNN mixer, combine the plurality of mixer inputs, and produce a mixer output. The DNN mixer is configured for one of a) receiving the forecast output from each of the one or more DNN forecasters at a respective input of the plurality of mixer inputs for producing the one or more output time-series datasets, or b) receiving the plurality of input time-series datasets for producing an input to the one or more DNN forecasters. The one or more DNN forecasters and the DNN mixer are configured in software and are executable by the processing device.

According to another embodiment of the present disclosure, a method includes the step of receiving, at each of a plurality of Deep Neural Network (DNN) forecasters, an input corresponding at least partially to a time-series dataset of a plurality of input time-series datasets. The method also includes the step of producing, from each of the plurality of DNN forecasters, a forecast output. Furthermore, the method includes providing the forecast output from each of the plurality of DNN forecasters to a respective input of a plurality of mixer inputs of a DNN mixer for combining the forecast outputs to produce one or more output time-series datasets. The plurality of DNN forecasters and the DNN mixer are configured in software and are executable by a processing device.

According to yet another embodiment of the present disclosure, a non-transitory computer-readable medium is configured to store computer logic having instructions. The instructions, when executed, cause one or more processing devices to receive, at each of a plurality of Deep Neural Network (DNN) forecasters, an input corresponding at least partially to a time-series dataset of a plurality of input time-series datasets. The instructions also cause the one or more processing devices to produce, from each of the plurality of DNN forecasters, a forecast output. Also, the forecast outputs from each of the plurality of DNN forecasters are provided to a respective input of a plurality of mixer inputs of a DNN mixer for combining the forecast outputs to produce one or more output time-series datasets. The plurality of DNN forecasters and the DNN mixer are configured in software and are executable by the one or more processing devices.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

FIGS. 8-10 are functional block diagrams of various DNN mixers that may be incorporated in the multi-variate forecasters of FIGS. 2-7, according to various embodiments.

DETAILED DESCRIPTION

Figure 1:
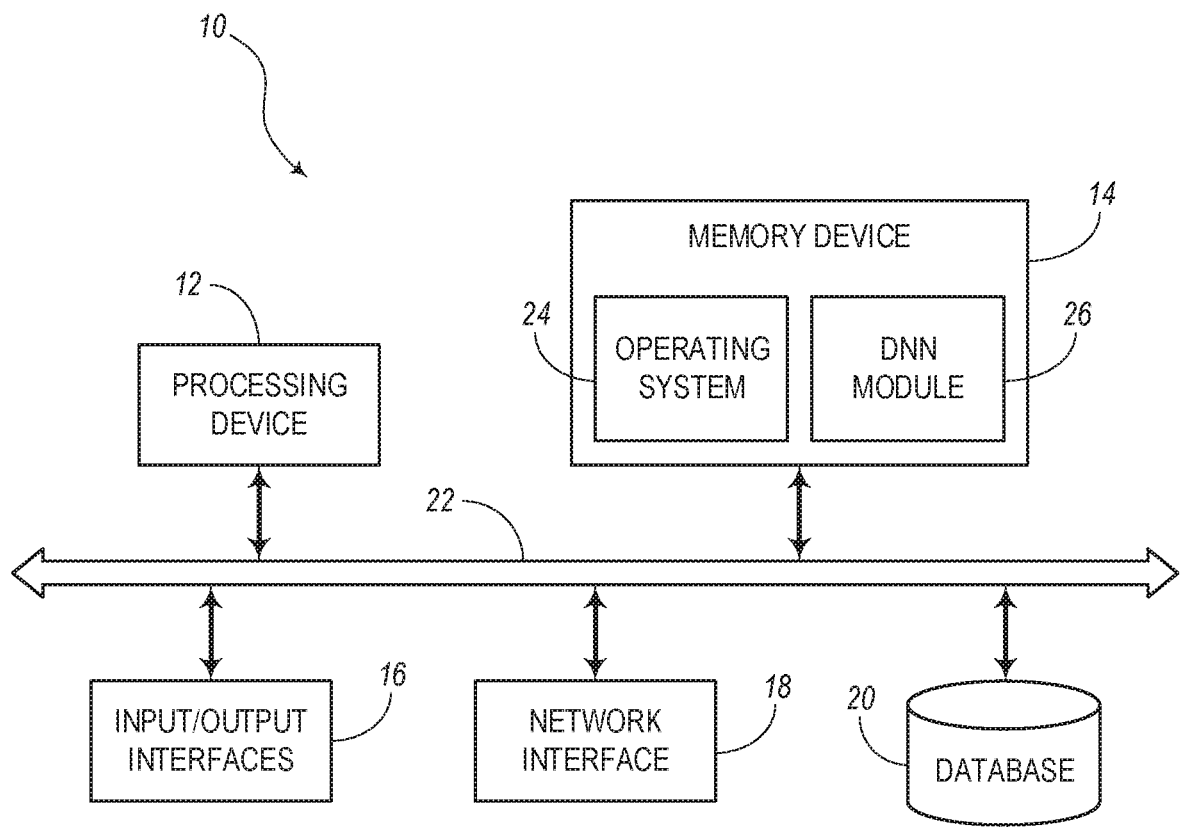
FIG. 1 is a block diagram of a computing system configured to forecast future data values for a system from which multi-variate time-series datasets are obtained, according to various embodiments of the present disclosure.

The present disclosure relates to systems and methods for forecasting future conditions or events of any type of system or environment that is to be monitored. The forecasting systems and methods disclosed herein may include Deep Neural Network (DNN) models, and more particularly, may include a DNN mixer for mixing or combining multi-variate time-series inputs. The DNN models described in the present disclosure may be configured to receive multiple input sets of time-series data, where each input set may be related to or unrelated to the output time-series representing the forecast for the monitored system or environment. The "multi-variate" time-series datasets described in the present disclosure may refer to a plurality of time-series datasets where at least two of the time-series datasets include different types of parameters or variables. Also, one or more "output" time-series datasets may include types of parameters that are different from the types of parameters of one or more of a plurality of "input" time-series datasets.

As opposed to conventional forecasting solutions, the DNN approach used in the present disclosure may be able to adjust itself to each dataset and therefore is able to obtain better forecasting results. According to various embodiments, the present approaches may include processing through a multi-layer DNN mixer architecture and finding a non-linear transformation of the input data to the mixer. As the DNN mixer is trained with the dataset, it may actually put different weights on different samples, unlike the traditional approaches that treat all samples the same.

The embodiments of the present disclosure may be configured to overcome many of the deficiencies of the conventional models. For example, the conventional models may use linear transformations of the input data at the reducer, which might work only if the relationship between the time-series can be described as a weighted sum. However, this is normally not the case. In contrast to this solution, the embodiments of the present disclosure use a non-linear approach to better fit the data, regardless of whether the time-series can be described as a weighted sum.

Also, the conventional solutions use a transformation that is based on the particular model used, which may be based on a sum of Gaussian random variables for PCA, multi-dimensional ARIMA for VAR, etc. The approach in the present disclosure is model-free and lets the DNN mixer learn the best model from the data in the dataset. Another issue with the conventional models is that the transformation treats all instances of the dataset the same way (e.g., by using first or second order statistics). On the other hand, the approach used by the embodiments of present disclosure may use stochastic optimization, which naturally assigns the importance to instances commensurate to how good they are at improving the forecaster.

The present disclosure relates to systems and methods for forecasting future results based on time-series data. The forecasting models may start with a Deep Neural Network (DNN) with an architecture using a time-series decomposition approach. However, the capacity of the DNN of the present disclosure can be increased by enabling it to devise a "separate" time waveform for each forecasted data point instead of providing a "common" time waveform for all the data points as is done in conventional systems. The forecasting models of the present disclosure are able to improve prediction performance, even on a dataset having complicated or only partially available periodic patterns.

The techniques described herein, which provide improvements over previous techniques, use a time-series "mixer," which can adjust itself to the dataset during the training procedure. This novel part of the architecture is able to adjust the way that input single-variate time-series are combined per dataset, so that it can adjust the significance of each input time-series depending on its relationship to the time-series being forecast.

Furthermore, the present techniques are high-capacity techniques, using modern DNN-based forecasters in a single DNN architecture. One of skill in the art of forecasting will appreciate the value of the architecture of the routines described below. Also, it may be noted that the present routines allow for a fully automated training of forecasters (e.g., through hyper-parameter optimization) and can simplify implementation of the routines due to their use as a single prediction technology (e.g., DNN).

The techniques described herein may be referred to as being "model-free," meaning that they can learn the best way to combine time-series datasets through training. The DNN mixers, described herein, are able to multiply some matrix with an input and can adjust the processing of finding the matrix being multiplied, which is unique with respect to previous solutions. In the present disclosure, the matrix is learned and does not merely include a fixed formula. Also, the present solutions may use stochastic optimization based on a dataset.

The DNN mixers described in the present disclosure attempt to find a combined time-series. The mixers do not necessarily try to reduce the information, as is done in the conventional PCA models, but attempt to find the best information out of the multiple time-series input datasets. The DNN mixers may also reduce dimensionality from k to 1, as described herein, but this is not the main function. Instead, one goal of the mixers is to extract information out of the time-series that is pertinent for the forecast. This can also be accomplished with less information.

The Machine Learning (ML) methods of the forecasters of the present disclosure may be adjusted based on the data obtained from the monitored system and/or can adjusted based on how weights can be learned. Another difference the present disclosure and previous solutions (e.g., PCA, VAR, etc.) is that the present embodiments may be configured to create non-linear forecasts. The data is learned to create a non-linear function. The embodiments herein create a new function or formula that is solved by a ML process.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

FIG. 1 is a block diagram of a computing system 10 configured to obtain a time-series. From the time-series, the computing system 10 is configured to forecast future data points and provide output regarding the forecast results. Furthermore, according to some embodiments, the computing system 10 may also be configured to make decisions based upon the forecast and/or enact (or instruct other systems to enact) various predetermined actions. In this embodiment, the computing system 10 includes a processing device 12, a memory device 14, input/output (I/O) interfaces 16, a network interface 18, and a database 20, each of which may be interconnected via a local interface 22.

The memory device 14 may include an operating system (O/S) 24. The memory device 14 may be configured as non-transitory computer-readable media and may store one or more software programs, such as a DNN module 26. The software programs may include logic instructions for causing the processing device 12 to perform various steps. For example, the DNN module 26 may be configured to enable the processing device 12 to process multi-variate time-series data to calculate a forecast of future data points. An associated program may be associated with the DNN module 26 for making decisions based on the results of the forecast provided by the DNN module 26.

According to some embodiments, the computing system 10 may be connected within a telecommunications network for obtaining time-series data from the telecommunications network and performing predetermined actions (or giving instructions about actions to be taken) on the telecommunications network based on the forecast results. The network interface 18 of the computing system 10 may, therefore, be connected to a network (not shown) (e.g., communication network) and obtain time-series information about the network. The details of the DNN module 26 are described in more detail below for calculating a forecast of various conditions of the network (or other systems or environments) and enacting change on the corresponding network or system as needed based on the forecast. Obtaining the time-series data may include obtaining multi-variate time-series datasets via a telemetry process from an optical network. The multi-variate time-series datasets may span multiple layers, multiple performance monitoring processes, or packet monitoring measurements. In some embodiments, a method may further include storing the multi-variate time-series datasets at one or more network edge devices of the optical network or in a cloud device and self-labelling the multi-variate time-series datasets to allow the multi-variate time-series datasets to be used as inputs to the DNN forecasters The self-labelling may include creating time-series windows with partitions of historical and future values, whereby the historical values may be used as input to the DNN forecasters and the future values may be used as output from the DNN mixer. The method may also include using the self-labeled data to train a machine learning algorithm including at least the DNN mixer. However, the computing system 10 may be utilized in other environments for forecasting other types of systems.

Those skilled in the pertinent art will appreciate that various embodiments may be described in terms of logical blocks, modules, circuits, algorithms, steps, and sequences of actions, which may be performed or otherwise controlled with a general-purpose processor, a DSP, an application-specific integrated circuit (ASIC), a field-programmable gate array, programmable logic devices, discrete gates, transistor logic, discrete hardware components, elements associated with a computing device, or any suitable combination thereof designed to perform or otherwise control the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, those skilled in the pertinent art will appreciate that the various illustrative logical blocks, modules, circuits, algorithms, and steps described in connection with the embodiments described in the present disclosure may be implemented as electronic hardware, computer software, or any suitable combinations thereof. To clearly illustrate this interchangeability of hardware and software, various illustrative components, blocks, modules, circuits, algorithms, and steps have been described herein in terms of their general functionality. Whether such functionality is implemented in hardware or software depends upon the particular application and design constraints, and those skilled in the pertinent art may implement the described functionality in various ways to suit each particular application, but such implementation decisions should not be interpreted as causing a departure from the scope or spirit of the present disclosure. Additionally, the various logical blocks, modules, circuits, algorithms, steps, and sequences of actions described herein can be considered to be embodied entirely within any form of computer readable storage medium having stored therein a corresponding set of computer instructions that upon execution would cause an associated processor to perform the functionality described herein. Thus, the various aspects and embodiments disclosed herein may be embodied in a number of different forms, all of which have been contemplated to be within the scope or spirit of the claimed subject matter. In addition, for each of the embodiments described herein, the corresponding form of any such embodiments may be described herein as, for example, "logic configured to" perform the described action.

In the illustrated embodiment shown in FIG. 1, the computing system 10 may be a digital computer that, in terms of hardware architecture, generally includes the processing device 12, the memory device 14, the I/O interfaces 16, the network interface 18, and the database 20. The memory device 14 may include a data store, database (e.g., the database 20), or the like. It should be appreciated by those of ordinary skill in the art that FIG. 1 depicts the computing system 10 in a simplified manner, where practical embodiments may include additional components and suitably configured processing logic to support known or conventional operating features that are not described in detail herein. The components (i.e., 12, 14, 16, 18, 20) are communicatively coupled via the local interface 22. The local interface 22 may be, for example, but not limited to, one or more buses or other wired or wireless connections. The local interface 22 may have additional elements, which are omitted for simplicity, such as controllers, buffers, caches, drivers, repeaters, receivers, among other elements, to enable communications. Further, the local interface 22 may include address, control, and/or data connections to enable appropriate communications among the components 12, 14, 16, 18, 20.

The processing device 12 is a hardware device adapted for at least executing software instructions. The processing device 12 may be any custom made or commercially available processor, a central processing unit (CPU), an auxiliary processor among several processors associated with the computing system 10, a semiconductor-based microprocessor (in the form of a microchip or chipset), or generally any device for executing software instructions. When the computing system 10 is in operation, the processing device 12 may be configured to execute software stored within the memory device 14, to communicate data to and from the memory device 14, and to generally control operations of the computing system 10 pursuant to the software instructions.

It will be appreciated that some embodiments of the processing device 12 described herein may include one or more generic or specialized processors (e.g., microprocessors, Central Processing Units (CPUs), Digital Signal Processors (DSPs), Network Processors (NPs), Network Processing Units (NPUs), Graphics Processing Units (GPUs), Field Programmable Gate Arrays (FPGAs), and the like). The processing device 12 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry or logic" that is "configured to or adapted to" perform a set of operations, steps, methods, processes, algorithms, functions, techniques, etc., on digital and/or analog signals as described herein for the various embodiments.

The I/O interfaces 16 may be used to receive user input from and/or for providing system output to one or more devices or components. The user input may be provided via, for example, a keyboard, touchpad, a mouse, and/or other input receiving devices. The system output may be provided via a display device, monitor, graphical user interface (GUI), a printer, and/or other user output devices. I/O interfaces 16 may include, for example, a serial port, a parallel port, a small computer system interface (SCSI), a serial ATA (SATA), a fiber channel, InfiniBand, iSCSI, a PCI Express interface (PCI-x), an infrared (IR) interface, a radio frequency (RF) interface, and/or a universal serial bus (USB) interface.

The network interface 18 may be used to enable the computing system 10 to communicate over a network, such as the telecommunications network, the Internet, a wide area network (WAN), a local area network (LAN), and the like. The network interface 18 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 18 may include address, control, and/or data connections to enable appropriate communications on the telecommunications network 10.

The memory device 14 may include volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the memory device 14 may incorporate electronic, magnetic, optical, and/or other types of storage media. The memory device 14 may have a distributed architecture, where various components are situated remotely from one another, but can be accessed by the processing device 12. The software in memory device 14 may include one or more software programs, each of which may include an ordered listing of executable instructions for implementing logical functions. The software in the memory device 14 may also include any suitable operating system (e.g., O/S 24) and one or more computer programs. The operating system 24 essentially controls the execution of other computer programs, and provides scheduling, input-output control, file and data management, memory management, and communication control and related services. The computer programs may be configured to implement the various processes, algorithms, methods, techniques, etc. described herein.

The memory device 14 may include a data store (e.g., database 20) used to store data. In one example, the data store may be located internal to the computing system 10 and may include, for example, an internal hard drive connected to the local interface 22 in the computing system 10. Additionally, in another embodiment, the data store may be located external to the computing system 10 and may include, for example, an external hard drive connected to the I/O interfaces 16 (e.g., SCSI or USB connection). In a further embodiment, the data store may be connected to the computing system 10 through a network and may include, for example, a network-attached file server.

Moreover, some embodiments may include a non-transitory computer-readable storage medium having computer readable code stored in the memory device 14 for programming the computing system 10 or another processor-equipped computer, server, appliance, device, circuit, etc., to perform functions as described herein. Examples of such non-transitory computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by the processing device 12 that, in response to such execution, cause the processing device 12 to perform a set of operations, steps, methods, processes, algorithms, functions, techniques, etc. as described herein for the various embodiments.

In operation, the network interface 18 is able to obtain a time-series of one or more characteristics or parameters of a particular environment. For instance, the network interface 18 may obtain network time-series data regarding various conditions or features of the network. The time-series information may be obtained by using any suitable measurement devices for automatically measuring the information or by any other suitable manner.

A "time-series" is a series of data points obtained progressively over time. In many cases, a time-series may be plotted in a graph with time referenced on the x-axis and some metric, characteristic, or parameters referenced on the y-axis. The time-series may be a sequence of measurements taken at equally-spaced points in time. From the time-series data, the DNN module 26 is configured to analyze the information to extract meaningful characteristics of the data to devise a forecast or prediction of future values based on the previously-obtained values.

The computing system 10 may be configured as an Artificial Neural Network (ANN) device for processing the time-series in a logical manner to receive input (e.g., time-series data), performing certain processing on the input (e.g., forecasting), and providing some output based on the processing steps (e.g., making changes to the network). The ANN device may be configured to process the pieces of information according to a hierarchical or layered arrangement, where the lowest layer may include the input, and the highest layer may include the output. One or more intermediate deep-learning layers may be involved in processing the input to arrive at reasonable outputs. A Deep Neural Network (DNN) may have multiple intermediate layers each having a set of algorithms designed to recognize patterns through clustering, classifying, etc. The recognized patterns may be numerical patterns or vectors In the environment of a telecommunications network, forecasting can be a fundamental service that can be optimized to enable more efficient network operations. Forecasting may be applicable for the purpose of planning and provisioning network resources that may be needed in the future based on trends. Forecasting in the telecommunications environment may also be useful for operating virtualized network services and for proactively performing maintenance on equipment before the equipment fails.

With the configuration of FIG. 1, the computing system 10 may be employed as a closed-loop forecasting system. Other than the network, the computing system 10 can forecast time-series data for use in a number of different environments. When used with the network, the DNN module 26 may be configured to allow a network administrator to enact certain changes to the network based on the forecasting results. For example, one use case of the forecasting processes is for network planning/provisioning. The DNN module 26 may forecast long-term network demands for network equipment planning. The DNN module 26 may also forecast medium-term/periodic network demands for proactive connection re-routing and may include a decision to delay equipment purchases. Also, the DNN module 26 may also be configured to forecast short-term congestion on the network using link utilization information and/or packet loss information. Also, forecasts of congestion may be used for proactively re-routing connections in the network. The re-routing may also be based on additional information of the network, such as service factors like Quality of Service (QoS) and/or Quality of Experience (QoE) assurance information.

In addition to network planning/provisioning, the results of the forecasting processes of the present disclosure may also be used with respect to virtualized network services. The DNN module 26 may be configured to forecast server utilization to enable smarter placement of virtualized network functions (VNFs). Also, the DNN module 26 may be configured to forecast network demand for planning the deployment and/or upgrade of edge computer equipment. The DNN module 26 may also forecast application demand and may instruct related decision-making processes to pre-deploy VNFs, such as content cache, virtual Evolved Packet Core (vEPC), etc.

Another application of the forecasting results may include proactive maintenance of equipment on the network. The DNN module 26 may be configured to forecast alarm threshold crossings and/or forecasting Signal to Interference-plus-Noise Ratio (SINR) degradation that may result in a high Bit Error Ratio (BER).

According to some embodiments, the DNN module 26 may be utilized based on the following example. The DNN module 26 may receive a single-variate (or univariate) time-series x(t) for the purpose of forecasting the future values of the time-series x(t). The time-series x(t) may be included within a historical window $w_h$, while future values may be included in a future window $w_f$.

At the time of the forecast, past values of the time-series x(t) are available, starting at time $t_0$. The time-series can, therefore, be written as $x(t_0, t_0+\Delta, \ldots, t_0+(w_h-1)\Delta)$. At the time of the forecast, future values are not known, and the DNN module 26 may provide an estimate of these future values, written as $\hat{x}(t_0+w_h\Delta, t_0+\Delta, \ldots, t_0+(w_h+w_f)\Delta)$. As the underlying random process evolves, future time-series values become available, so $x(t_0+w_h\Delta, t_0+\Delta, \ldots, t_0+(w_h+w_f)\Delta)$ can be used to check the validity of the estimate $\hat{x}(t_0+w_h\Delta, t_0+\Delta, \ldots, t_0+(w_h+w_f)\Delta)$.

The DNN module 26, as described in more detail below, may be an AI-based forecaster. When tested, it was determined that the methods of the DNN module 26 of the present disclosure provides a more accurate forecast than other known forecasters, even the winner of the M4 competition. The dataset of the M4 forecasting competition was applied to the DNN module 26 of the present disclosure, and the results indicate a significant improvement over the M4 winning forecaster. In particular, in one experiment for obtaining a quality factor (Q-factor) forecast for an optical network, a conventional LSTM model resulted in a −106% gain over baseline, whereas the embodiments of the multi-variate models described in the present disclosure achieved a 89% gain over baseline, which is a significant improvement of the conventional LSTM model.

In some embodiments, the DNN module 26 of the present disclosure may include a couple key steps that make the forecaster work better than the previous approaches. A first key step is that the DNN module 26 includes a more advanced Deep Neural Network (DNN) architecture than other forecasters. The neural network architecture of the DNN module 26 creates separate but related forecasting functions for each forecasted time point, as opposed to previous solutions that use one forecasting function for all the forecasted time points. According to some embodiments, this strategy accounts for about two-thirds of the gain of the DNN module 26.

Another key step is that the DNN module 26 may be configured to generate better forecasting functions. For example, the neural network of the DNN module 26 may use an inverse Wavelet transform in some layers, which performs better on a wider number of datasets than a Fourier transform. About one-third of the gain of the DNN module 26 comes from the inverse Wavelet transform processes.

Despite the large size of the DNN of the DNN module 26, it can be trained for tens of thousands of time-series points in a matter of single-digit minutes on a laptop and can make forecasts on the laptop on the order of milliseconds. When used with a Graphics Processing Unit (GPU) or Tensor Processing Unit (TPU), the computational performance may be significantly better.

According to some of the preferred embodiments of the present disclosure, the DNN module 26 may include a process for forecasting of single or multiple time-series, which may be correlated to other time-series. In particular, the processes may use multiple correlated time-series as an input to a DNN whose output is a forecast of future values of one or more time-series. The forecasted output time-series may be directly related to one of the input time-series, or it may be inferred from the input time-series (e.g., if the forecasted time-series does not have enough historical information, but other time-series do).

A single-variate forecaster may be defined as an algorithm that takes as input a time-series corresponding to one measurement and outputs a time-series corresponding to the future values of the measurement. A multi-variate forecaster may be defined as an algorithm that takes as input multiple time-series corresponding to multiple measurements with the same collection times, where this forecaster can output future values of one or more time-series that may be related or unrelated to the input time-series, but may have measurements of interest that correspond in some way. In general, the inputs and outputs of the multi-variate forecaster do not have to correspond to the same set of measurements.

An advantage of using multi-variate forecasters over single-variate forecasters is that multi-variate forecasters are able to use external information, which may not necessarily be available in the time-series of interest. This external information, which may be included in many sets of time-series data, may be used to improve the forecasts because it adds additional information about the time-series of interest, even when the information is not included in the forecasted time-series itself, but which may be included in the other time-series data given as an input to the forecaster.

The multi-variate approach of the present disclosure may use a mechanism, which is not included in conventional solutions, to combine multiple single-variate forecasters. Many different types of single-variate forecasters could be used in these processes, including the single-variate ResNet forecaster described in related U.S. patent application Ser. No. 16/687,902, having the same inventive entity as the present application. In particular, the forecaster of application Ser. No. 16/687,902 can be used to forecast time-series, where no other related time-series are available. The processes of the present disclosure may be configured to go beyond that forecaster to use a number of forecasters (not necessarily ResNet based) combined in a novel way to obtain forecasts simultaneously taking advantage of information from multiple sources.

It should be noted that the forecaster described in the present disclosure is applicable to many network forecasting problems, which may be directly used in various networking products. Multi-variate forecasting can be a useful tool for network planning, provisioning, and proactive maintenance.

Network Use Cases

The following describes specific use cases for multi-variate forecasting, particularly in an optical communication network. A first use case may include "predicting packet performance" (e.g., latency, loss, etc.) on a path using multiple link measurements (e.g., utilization, packet counters, etc.). By predicting packet performance, a network operator may be able to make better routing decisions. The network operator may use the DNN module 26 of the computing system 10 to measure latency, loss, and other parameters and then use these parameters to make better routing decisions. The DNN module 26 allows the network operator to look at latency across multiple links. The DNN module 26 can take measurements across those links to obtain parameters from the multiple links as input. From these measurements, the DNN module 26 can predict, as accurately as possible, the input frequency given the constituent parts of the links. The measurements may represent different types of data, which can be "multi-variate" (i.e., involving multiple types of variable quantities), whereas previous systems are typically a single type of variable.

A second use case in the optical communication network may include "predicting when a link will run out of capacity or when it will cross a utilization threshold." By using historical demand profile of the end-to-end services transiting the link, this prediction can be obtained. The results may be used by the network operator to enable better staging of equipment, distributing the cost of upgrading networks, etc. The measurements can be obtained from the links, where each link may include a counter for counting how many packets are going across the respective link, even if it is unknown what the constituent parts of the traffic are. The DNN module 26 can observe the constituent parts of the traffic and make a better prediction. For instance, if one of the parts increases significantly when the others do not, this may be observed from in an aggregate sum.

In addition, another use case may include "predicting a start-of-life SNR" for a yet-to-be-provisioned wave on a fiber from the Signal to Noise Ratio (SNR) or Quality factor (Q-factor) measurements of existing waves on the fiber, which could prevent under-utilization of available SNR margin. The SNR of the optical links can be an important metric to calculate and can indicate what modulation rate can be achieved on the link. If a network operator has the capability of changing that modulation over time, he or she may want to know what the SNR might be in the future. For example, if a network operator decides on one day on a modulation of 200 Gb/sec, but determines that two weeks from that day, the network may not have the SNR for that, the network operator may need to be prepare for this situation. In some previous solutions, SNR could be predicted only by using SNR input, that is, in a single-variate approach. However, in the present disclosure, the forecaster (e.g., DNN module 26) may utilize any types of network parameters (i.e., related to SNR and/or unrelated to SNR) to predict future SNR values, using a multi-variate approach.

Another use case may include "predicting long-term Q-factor" of a wave from comprehensive measurements for the wave (e.g., Q-factor, Polarization Mode Dispersion (PMD), Chromatic Dispersion (CD), etc.), which could prevent outages. The present forecasters can look at SNR and other measurements (e.g., Q factor, PMD, CD) coming with the same link representing various characteristics of the fiber. Using those measurement, the forecaster can make a better prediction than what we could be done in previous solutions.

Yet another use case in the optical communication network environment includes "predicting the SNR" of the waves on a submarine link. This can be measured from their power levels, which enables more efficient power control and higher throughput.

A further use case may include "predicting User Equipment (UE) packet losses" at a wireless base-station using Signal to Interference-plus-Noise Ratio (SINR) measurements of the UE. The traffic measurements of the UE and cross-traffic of other UEs could be used to improve spectral usage by the base-station.

Although these use cases are described with respect to an optical communication network, it should be noted that the DNN module 26 may be used for predicting future events, conditions, datasets, etc. of any type of system or environment by obtaining multi-variate input datasets from the system or environment and processing the different variables in such a way that an output dataset representing the forecast can be created. Thus, the present disclosure can be extended beyond the scope of communication networks. Also, the multi-variate input datasets may include datasets that are unrelated to the monitored system. For example, datasets representing variables such as population growth, industry development, or other variables that may normally be considered to be unrelated, or at least not directly related to a system (e.g., network) for which predictions are to be determined. Thus, the population growth, for instance, can be used with network parameters to make a better prediction of network equipment deployment. This unrelated or partially related data can be coupled with network datasets in this example to also predict where traffic should be routed (i.e., when more people will be using the network) and where the population growth is trending to learn where additional equipment may be needed.

Another example of a system for which forecasts can be created is vehicle traffic management. The computing system 10 could be used (e.g., by taxi drivers, personal transportation services such as Uber or Lyft, Department of Transportation, mobile phone map applications, etc.) to monitor traffic conditions of vehicles, available roadways, etc. Measurements can be updated, and this information can be sourced to systems for enabling route planning, road construction planning, etc. In one example, if a driver wants to predict how long it will likely take to go from point A to point B, information of the currently available roads, road conditions (e.g., current vehicle traffic, rain, snow, ice, etc.), certain latency measures can be predicted. As described in more detail below, the present embodiments utilize a mixer (e.g., DNN mixer) for combining the various parameters using different weights to optimize the ETA predictions.

Approaches using single-variate datasets can be applied to forecast multi-variate time-series, as long as the required output time-series is one of the input time-series (e.g., as described in U.S. patent application Ser. No. 16/687,902). The approach in that case may be to simply ignore other time-series. However, the approach described in the present disclosure may include ignoring potentially important information, which could result in better forecasting performance. The following are some examples where other information may potentially improve performance of forecasting:

| | |
|---|---|
| Single-variate network demand forecasting using only network information. | Multi-variate network demand forecasting using network information and business growth forecasts for the area where the network exists (e.g. population growth, GDP). |
| Single-variate packet loss prediction from utilization of a link in a network. | Multi-variate packet loss prediction taking utilization and all of the cross-traffic into consideration. |
| Single-variate packet loss/outage prediction for a UE using its SINR. | Multi-variate packet loss/outage prediction for a UE using SINR, UE's traffic and cross traffic. |
| Single-variate forecast of WL5 bookings. | Multi-variate forecast of WL5 bookings, taking economic factors (customers' business outlook) into consideration. |

It may be noted that the principle behind the multi-variate forecasting is that multiple correlated time-series are used jointly to improve the forecast over single-variate forecasting approaches. One benefit of multi-variate forecasting is that it is able to use external information, which may not be available in the time-series of interest but may be correlated to the forecasted time-series.

One aspect of the present disclosure that differs from conventional solutions is that some embodiments of processes may be used to mix or combine multiple time-series with a DNN. A processing routine for performing this mixing function may be referred to as a "DNN mixer," which differs from other forecasting solutions. In some embodiments, two different types of DNN architectures may be used to incorporate the DNN mixer in the forecasting model, as described below. A first type of DNN model may include an input-mixer architecture (e.g., FIGS. 2A-2B), which has the DNN mixer at the input of the multi-variate forecasting DNN. A second type of DNN model may include an output-mixer architecture (e.g., FIGS. 3-7), which has the DNN mixer at the output of the multi-variate forecasting DNN. The output-mixer architecture may be preferred in many cases since tests of both types reveal better results for the output-mixer architecture.

The forecasters using the output-mixer architecture forecast significantly better than single-variate forecasters. Three different available datasets were used to test the DNN models, where a relative error metric (i.e., Symmetric Mean Absolute Percentage Error (SMAPE)) was determined to measure performance. In comparison to the single-variate ResNet forecaster presented in application Ser. No. 16/687,902, the DNN mixer of the present disclosure may improve the performance between 35% and 75% depending on the dataset and the single-variate forecaster used as a component. Also, multiple single-variate forecasters were tested (including the ResNet forecaster) as components of the DNN model architectures disclosed herein, showing that the performance of multi-variate forecasting in this case may be strongly dependent on having an effective mixer in place more so than having an effective single-variate forecaster. For example, the multi-variate forecaster built using single-variate LSTM forecasters may work better than the multi-variate forecaster built using single-variate ResNet forecasters. These results may be obtained despite the fact that the single-variate ResNet forecaster works better than the single-variate LSTM forecaster.

Input-Mixer Architecture

Figure 2A:
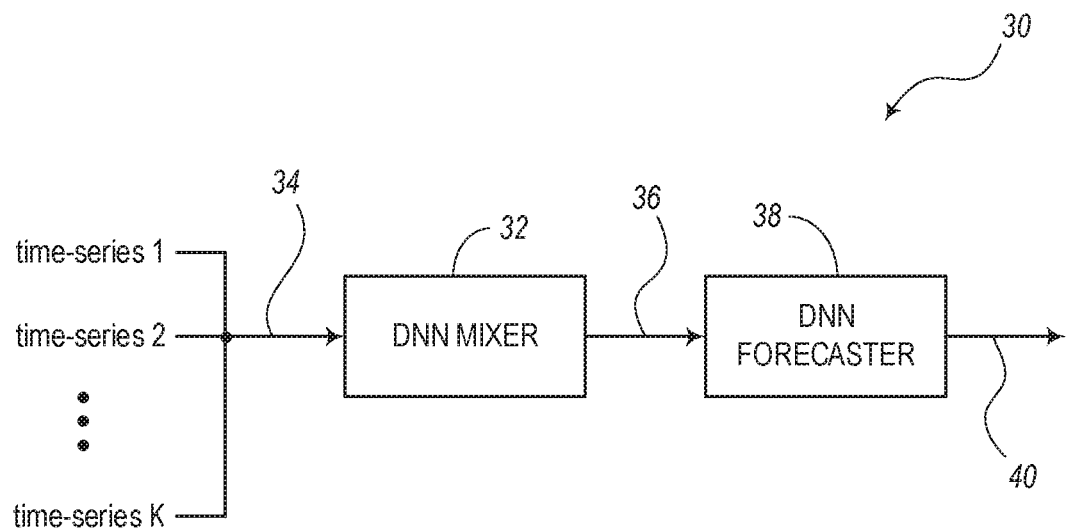
FIGS. 2A and 2B are functional block diagrams of DNN routines for a multi-variate forecaster having an input-mixer architecture, according to various embodiments.

FIG. 2A is a functional block diagram of a DNN routine 30 for a multi-variate forecaster having an input-mixer architecture. The DNN routine 30 in this embodiment (having the input mixer architecture) includes a DNN mixer 32, which is configured to process historical time-series. A number K of time-series (e.g., time-series 1, time-series 2, . . . time-series K) are provided to input 34 of the DNN mixer 32. The DNN mixer 32 combines the K historical time-series into a single summary time-series 36, which will be used to create a forecast. The output of the DNN mixer 32 is forwarded to a single-variate DNN forecaster 38, which then forecasts the future value of a time-series that is provided on output 40.

For example, the first time-series (i.e., time-series 1) may be written as $x_1(t_0, t_0+\Delta, \ldots, t_0+(w_h-1)\Delta)$, the second time-series (i.e., time-series 2) may be written as $x_2(t_0, t_0+\Delta, \ldots, t_0+(w_h-1)\Delta)$, and the Kth time-series (i.e., time-series K) may be written as $x_K(t_0, t_0+\Delta, \ldots, t_0+(w_h-1)\Delta)$. The combined time-series of the single summary time-series 36 may be written as $\ddot{x}(t_0, t_0+\Delta, \ldots, t_0+(w_h-1)\Delta)$ and the output time-series at the output 40 may be written as $\hat{x}(t_0+w_h\Delta, t_0+\Delta, \ldots, t_0+(w_h+w_f)\Delta)$.

The role of the DNN mixer 32 in this architecture is to create a representation of the historical time-series, which have a dimensionality of $kw_h$, into a representation with a reduced dimensionality $w_h$, which is input to the DNN forecaster 38. It is noted that the DNN mixer 32 outputs a new representation of the input time-series, which has a significantly smaller size than the input to the DNN mixer 32. (An output of a layer in a DNN (or a whole neural network) is called a "representation" of its output.) This reduces the complexity required by the DNN forecaster 38 (compared to the complexity of a forecaster having to handle time-series input with dimensionality of $kw_h$). The forecasting performance of this architecture may be affected by reduction of the historical information passed to the DNN forecaster 38.

Figure 2B:
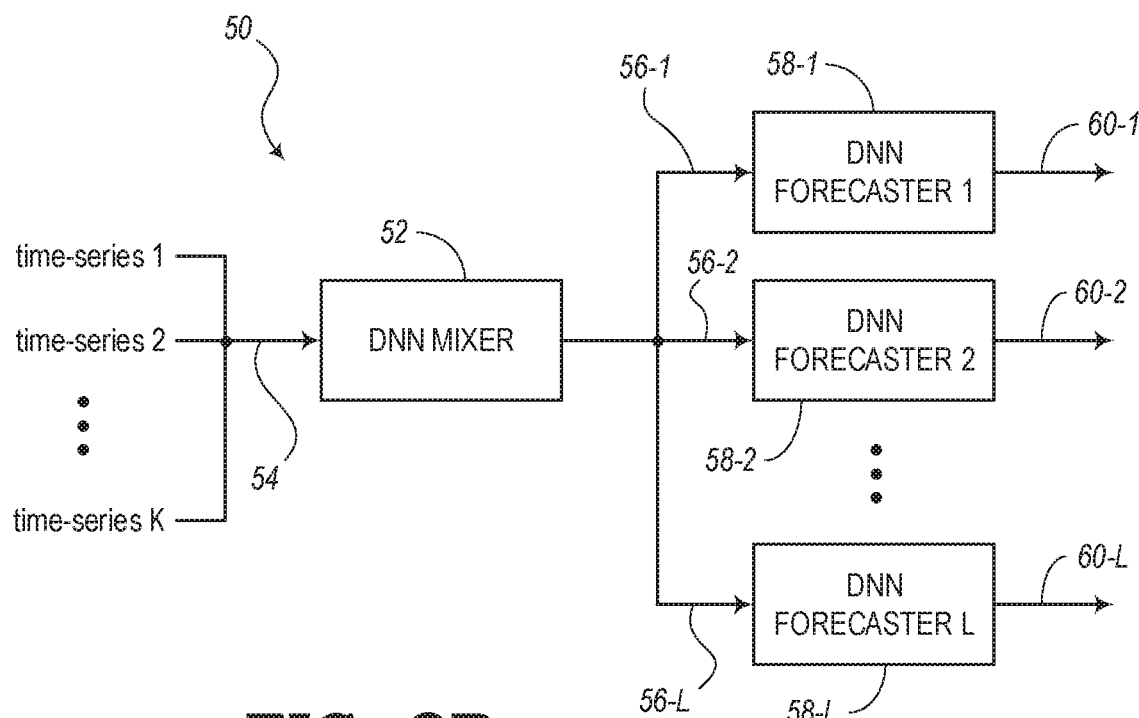

FIG. 2B is a functional block diagram of a DNN routine 50 for a multi-variate forecaster having an input-mixer architecture. The DNN routine 50 in this embodiment (having the input mixer architecture) includes a DNN mixer 52, which is configured to process historical time-series. A number K of time-series (e.g., time-series 1, time-series 2, . . . time-series K) are provided to input 54 of the DNN mixer 52. The DNN mixer 52 combines the K historical time-series into a summary time-series 56-1, 56-2, . . . 56-L, which will be used to create a forecast. The output of the DNN mixer 52 is forwarded to a single-variate DNN forecasters 58-1, 58-2, . . . , 58-L, which then forecast the future value of multiple time-series that are provided on outputs 60-1, 60-2, . . . , 60-L.

Again, the first time-series (i.e., time-series 1) may be written as $x_1(t_0, t_0+\Delta, \ldots, t_0+(w_h-1)\Delta)$, the second time-series (i.e., time-series 2) may be written as $x_2(t_0, t_0+\Delta, \ldots, t_0+(w_h-1)\Delta)$, and the Kth time-series (i.e., time-series K) may be written as $x_K(t_0, t_0+\Delta, \ldots, t_0+(w_h-1)\Delta)$. In this embodiments, however, the combined time-series of the single summary time-series 56-1 may be written as $\ddot{x}_1(t_0, t_0+\Delta, \ldots, t_0+(w_h-1)\Delta)$, the combined time-series of the single summary time-series 56-1 may be written as $\ddot{x}_2(t_0, t_0+\Delta, \ldots, t_0+(w_h-1)\Delta)$, and the combined time-series of the single summary time-series 56-1 may be written as $\ddot{x}_L(t_0, t_0+\Delta, \ldots, t_0+(w_h-1)\Delta)$. Also, in this embodiment, the output time-series at the output 40-1 may be written as $\hat{x}1(t_0+w_h\Delta, t_0+\Delta, \ldots, t_0+(w_h+w_f)\Delta)$, the output time-series at the output 40-2 may be written as $\hat{x}2(t_0+w_h\Delta, t_0+\Delta, \ldots, t_0+(w_h+w_f)\Delta)$, and the output time-series at the output 40-L may be written as $\hat{x}L(t_0+w_h\Delta, t_0+\Delta, \ldots, t_0+(w_h+w_f)\Delta)$.

Output-Mixer Architecture

Figure 3:
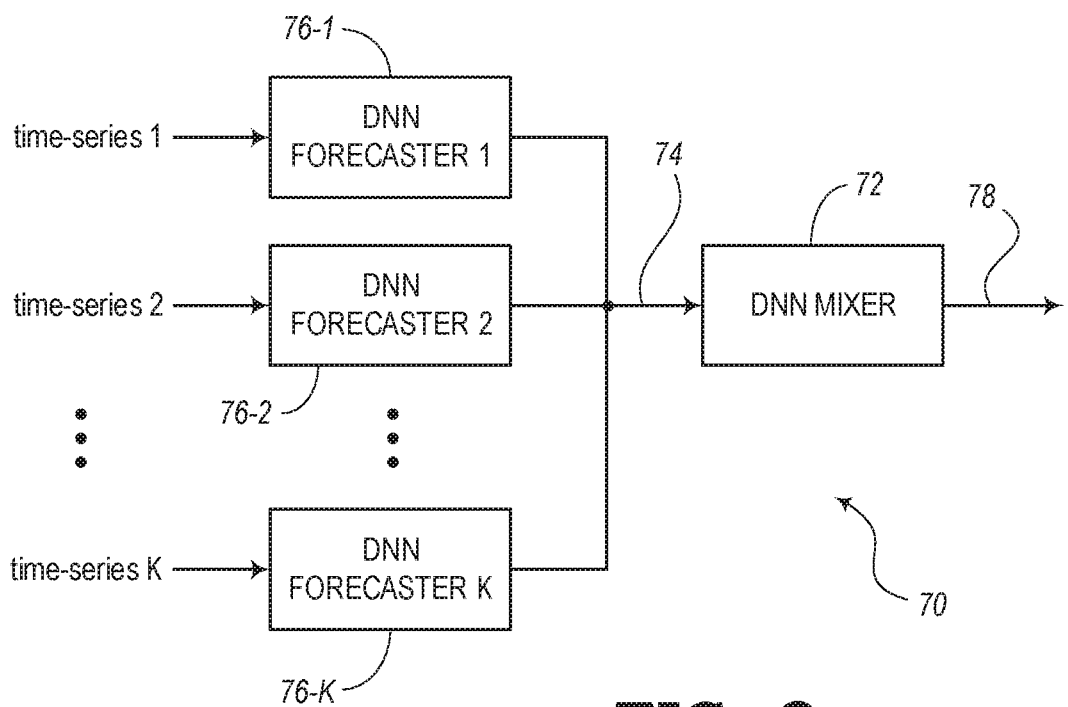
FIG. 3 is a functional block diagram of a first DNN routine for a multi-variate forecaster having an output-mixer architecture, according to various embodiments.

FIG. 3 is a functional block diagram of a DNN routine 70 for a multi-variate forecaster having an output-mixer architecture. The DNN routine 70 in this embodiment includes a DNN mixer 72, which processes forecasts of time-series. The input 74 to the DNN mixer 72 includes forecasts $\hat{x}1, \hat{x}2, \ldots, \hat{x}K$ from respective DNN forecasters 76-1, 76-2, . . . , 7-K, which provide forecasts of the input time-series $x_1, x_2, \ldots, x_k$, respectively. The output 78 of the DNN mixer 72 includes the forecast $\hat{x}$, which includes elements of all forecasts $\hat{x}1, \hat{x}2, \ldots, \hat{x}K$. It may be noted that 2 could be one of the input time-series, as well as, a time-series which is not input to the forecaster during the forecasting process, but is provided during training as the desired output of the forecaster when other time-series are its input.

The role of the DNN mixer 72 in this architecture is to create a representation of the K forecasts, which is required at the output of the routine 70. Namely, the forecast we are after has dimensionality $w_f$, which corresponds to a single time-series as described earlier. While the entirety of the historical information is used for the single-variate forecasts, not all of the forecasted information is used to form the forecast of the time-series of interest.

Forecasting methodologies can be improved, as described herein, by utilizing multi-variate datasets. For example, the datasets may be time-series datasets. In a previous solution, one DNN forecaster may be used for forecasting. However, in the present disclosure multiple DNN forecasters may be used where each DNN forecaster may be configured to directly or indirectly receive one or more single-variate datasets. Then, the multiple inputs (e.g., from the DNN forecasters themselves or from the multiple single-variate datasets) can be combined together in a mixer to obtain a single output dataset representing the forecast. Thus, a significant difference between the present disclosure and previous solution is the incorporation of a mixer, such as a DNN mixer, to mix these different datasets. In some respects, it may not matter what each of the forecasters do, but the different forecasts can be combined these forecasts in a non-linear fashion to get a better forecast. Thus, the DNN mixer 72 can mix the forecast from the DNN forecasters 76-1, 76-2, . . . , 76-K in a non-linear manner.

A benefit of the multi-variate approach of the present disclosure is that there may be times when certain measurements of one type of parameter may not be available or may not be enough to make an accurate forecast on its own. However, by utilizing other parameters, the forecasts can be improved. For example, if forecast for X is needed, but there is not enough historical data for X (or none at all), the DNN routine 70 may use other historical time-series datasets other than X to forecast X. In some cases, datasets that may be correlated to X in some way can be used. As an example, if an online sellers wants to forecast sales estimates of a certain item, but only has historical information related to similar items, the DNN routine 70 can use the multi-variate data in a non-linear way to determine an accurate prediction by adjusting the weights of each of the individual datasets. Some datasets, such as information of the Gross Domestic Product (GDP), may be used by the mixer, according to its assigned weight, to utilize this information to better predict sales.

With respect to a network environment, a network operator may wish to determine a prediction of how well a new network services may be received. This prediction may be based on information related to other previous services in the network that may be related to, unrelated to, or at least partially related to the new service. This information can be used to forecast how the new service might operate in that network.

There may also be times where all the information has not been collected yet or collection is spotty for certain types of parameters. The DNN routine 70 may also the available information, even if the amount of data is small, not complete, or not abundant. By adding in addition variables or measurements into the mix, the DNN routine 70 can still provide an accurate prediction from what is available. Similar to a "no data" case, the routine can operate if with a small or sporadic dataset. In this case, the routine may rely on other historical data that is at least partially related to make predictions on something for which there is little or no data.

Figure 4:
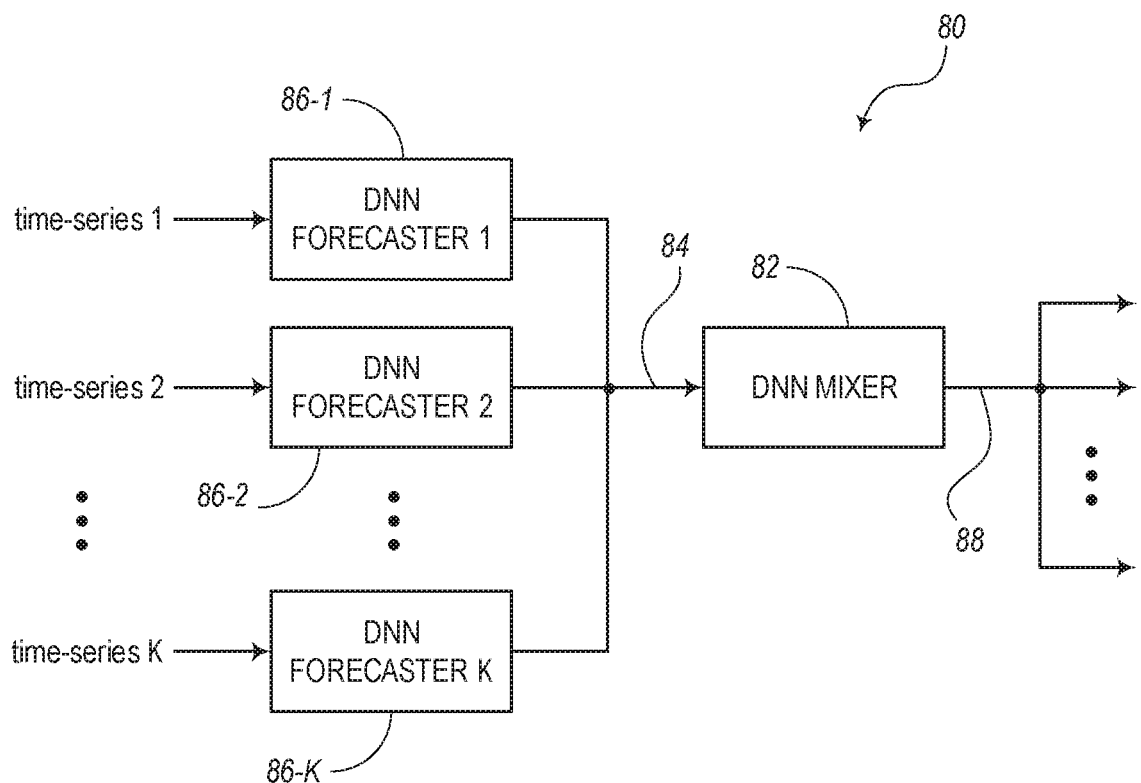
FIG. 4 is a functional block diagram of a second DNN routine for a multi-variate forecaster having an output-mixer architecture, according to various embodiments.

FIG. 4 is a functional block diagram of a DNN routine 80 for a multi-variate forecaster having an output-mixer architecture. The DNN routine 80 in this embodiment may be configured to provide multiple time-series forecasts in straight forward manner. The DNN routine 80 may be similar to the embodiment of FIG. 3, where the DNN mixer 82 receives at an input 84 the time-series from DNN forecasters 86-1, 86-2, . . . , 86-K. In this embodiment, the DNN mixer 82 changes the representation of the output of the K forecasters from dimension $kw_h$ to dimension $lw_f$, corresponding to the creation of L forecasts with a future horizon of $w_f$.

The embodiments of the DNN routines 70, 80 of FIGS. 3-4 are DNN multi-variate forecasters with an output mixer (e.g., DNN mixer 72, 82). The DNN routines 70, 80 with the output-mixer architecture may have some advantages over the input-mixer architecture of the embodiments of FIGS. 2A-2B. For example, the entirety of historical time-series information is included in the time-series forecast, which may result in better performance of the output-mixer architecture, especially if the input time-series are only weakly correlated.

The output-mixer architecture also has multiple parallel DNN forecasters 76, 86, allowing for parallel implementation during training and prediction. Also, the output-mixer architecture has more degrees of freedom with which to increase the capacity. For instance, the capacity of each DNN forecaster 76, 86 can be tailored to the forecast of its input time-series. Also, the capacity of the whole network can be easily made K higher than the input-mixer architecture as it has K DNN forecasters 76, 86, as compared to L DNN forecasters 58 in the embodiment of the input-mixer architecture of FIG. 2B.

Previous solutions have a low pattern reduction capacity and are limited to how much information they can learn and consequently how well a model can be fit. With a DNN, it is possible to infinitely extend the fitting process. For example, the PCA solution has one matrix it needs to find. With the DNN mixer 32, 52, 72, 82, it may be possible to find hundreds or thousands of matrices, which can greatly increase the fitting capacity of the entire forecaster. This can be an advantage over previous solutions. Also, the fitting can be non-linear, whereby conventional forecasters are normally linear. The DNN routines 30, 50, 70, 80 may be able to create a completely non-linear fit that can follow extremely unusual graphical shapes or patterns. The DNN routine 80 can have K×L input, where K is the number of input time-series datasets and L is the number of output time-series datasets. The fitting can be performed through a learning process. In some case, it may not be necessary to go through an entire dataset to determine the fit, but just enough where a generalization can be made about the remaining part of the dataset.

Therefore, according to the various embodiments shown in FIGS. 2A-2B having the input-mixer architecture and FIGS. 3-4 having the output-mixer architecture, a DNN routine (e.g., routines 30, 50, 70, 80) of a multi-variate forecaster may include one DNN forecaster 38 (FIG. 2A) or multiple DNN forecasters 58, 76, 86 (FIGS. 2B, 3, and 4). Each of the one or more DNN forecasters is configured for receiving an input corresponding at least partially to one or more time-series datasets of a plurality of historical multi-variate time-series datasets (i.e., time-series 1, time-series 2, . . . , time-series K). In FIGS. 3 and 4, the DNN forecasters 76, 86 receive the historical multi-variate time-series datasets. The one or more DNN forecasters are further configured for producing a forecast output corresponding at least partially to one or more output time-series datasets.

Furthermore, the DNN routine includes a DNN mixer configured for receiving a plurality of mixer inputs, combining the plurality of mixer inputs, and producing a mixer output. For example, as shown in FIGS. 3 and 4, the DNN mixer 72, 82 is configured for receiving a plurality of forecast outputs from the DNN forecasters 76, 86, wherein the DNN mixer 72, 82 is then configured for producing a single output time-series dataset (FIG. 3) or for producing multiple output time-series datasets (FIG. 4). Alternatively, as shown in FIGS. 2A and 2B, the DNN mixer 32, 52 is configured for receiving the plurality of historical multi-variate time-series datasets for producing an input to the single DNN forecaster 38 (FIG. 2A) or producing inputs to the multiple DNN forecasters 58 (FIG. 2B).

DNN Forecasters

According to some embodiments, the DNN forecasters 38, 58, 76, and 86 incorporated in the DNN routines 30, 50, 70, 80 of FIGS. 2A, 2B, 3, and 4, respectively, may be configured as two different types of forecasters and can be used in place of the single-variate forecasters in the input-mixer and output-mixer architectures. In one example, the DNN forecasters 38, 58, 76, and 86 may be configured as ResNet forecasters (e.g., the ResNet forecaster used in application Ser. No. 16/687,902), which may be single variate forecasters. In another example, the DNN forecasters 38, 58, 76, and 86 may be configured as Long Short-Term Memory (LSTM) forecasters based on LSTM techniques. These forecasters are shown in FIGS. 5 and 6 having a similar architecture as the DNN routine 70 of FIG. 3 having the output-mixer architecture.

Figure 5:
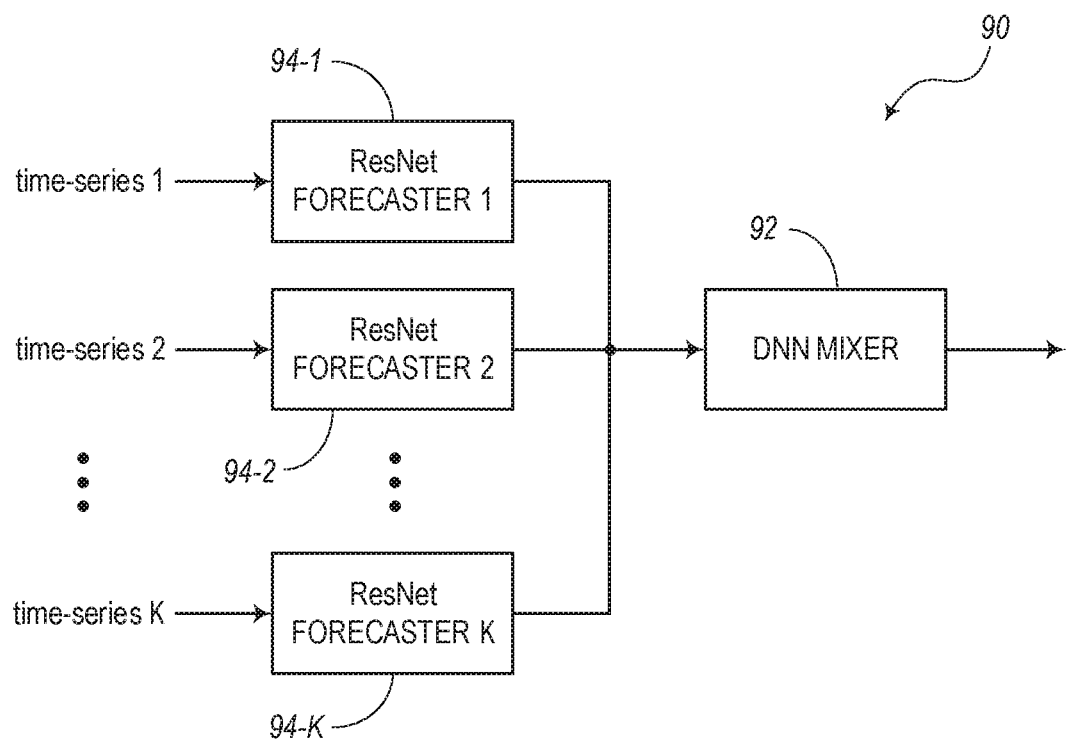
FIG. 5 is a functional block diagram of a third DNN routine for a multi-variate forecaster having an output-mixer architecture, according to various embodiments.

FIG. 5 is a functional block diagram of a DNN routine 90 for a multi-variate forecaster having an output-mixer architecture. In this embodiment, the DNN routine 90 include a DNN mixer 92 (e.g., similar to the DNN mixer 72 shown in FIG. 3). The DNN routine 90 also includes ResNet forecasters 94-1, 94-2, . . . , 94-K, which may be configured to replace the DNN forecasters 76-1, 76-2, . . . , 76-K shown in FIG. 3.

Figure 6:
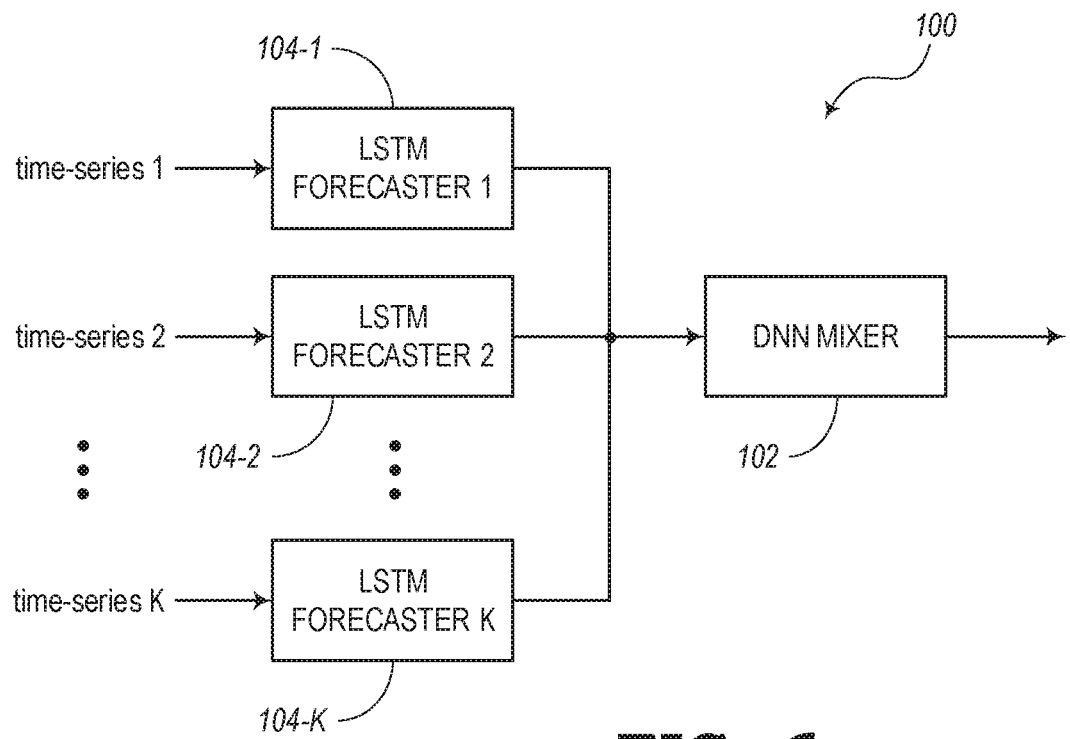
FIG. 6 is a functional block diagram of a fourth DNN routine for a multi-variate forecaster having an output-mixer architecture, according to various embodiments.

FIG. 6 is a functional block diagram of a DNN routine 100 for a multi-variate forecaster having an output-mixer architecture. In this embodiment, the DNN routine 100 include a DNN mixer 102 (e.g., similar to the DNN mixer 72 shown in FIG. 3). The DNN routine 100 also includes LSTM forecasters 104-1, 104-2, . . . , 104-K, which may be configured to replace the DNN forecasters 76-1, 76-2, . . . , 76-K shown in FIG. 3.

It may be noted that the embodiments of FIGS. 5-6 are just two examples of DNN forecasters and that other types of forecasters may be used in the different routines. For example, a low-capacity forecaster (e.g., ARIMA, Kalman filter, etc.) may be used, particularly if the training is done through an automatic differentiation procedure.

Figure 7:
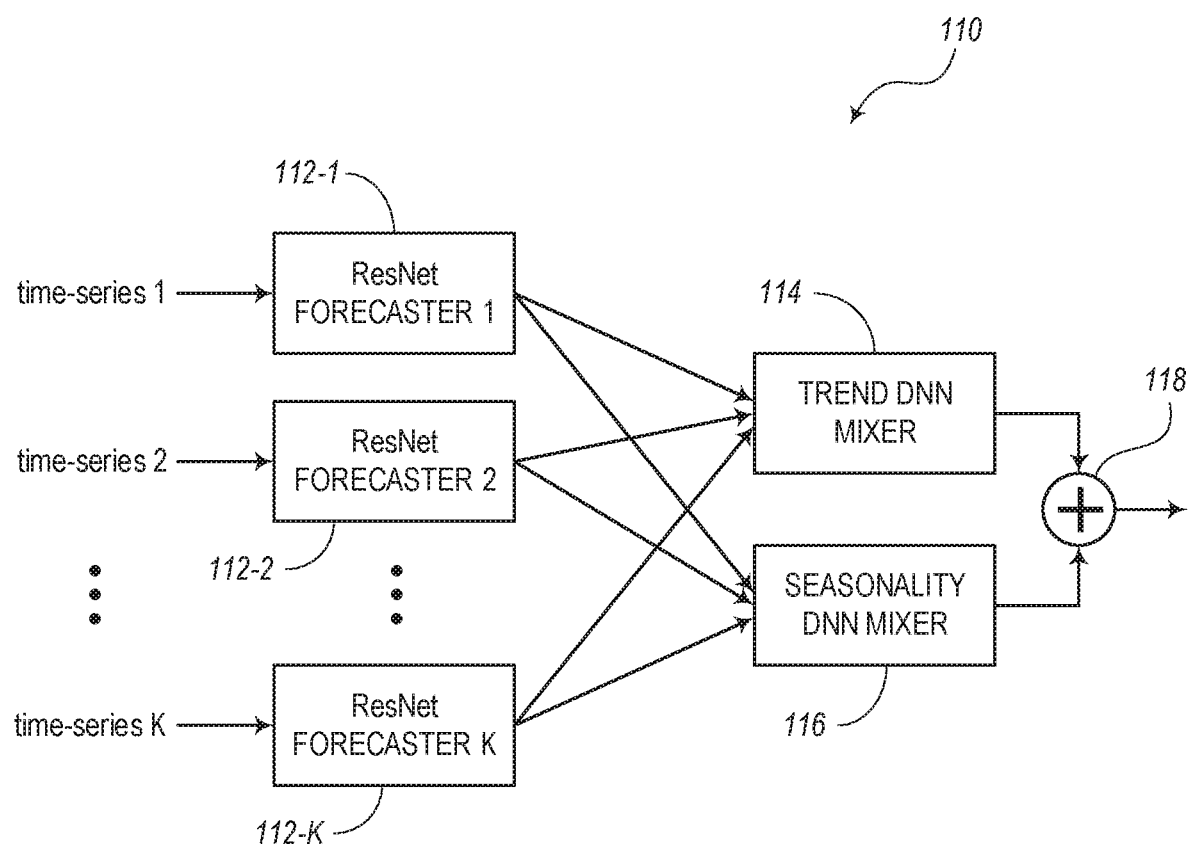
FIG. 7 is a functional block diagram of a fifth DNN routine for a multi-variate forecaster having an output-mixer architecture, according to various embodiments.

FIG. 7 is a functional block diagram of a DNN routine 110 for a multi-variate forecaster having an output-mixer architecture. In this embodiment, the DNN routine 110 in configured to process a number of time-series (i.e., time-series 1, time-series 2, . . . , time-series K) using a number of ResNet forecasters 112-1, 112-2, . . . , 112-K. The results from each of the ResNet forecasters 112-1, 112-2, . . . , 112-K are provided to both a trend DNN mixer 114 and a seasonality DNN mixer 116. The results of the trend DNN mixer 114 and seasonality DNN mixer 116 are added together using an adder 118 to provide an output time-series.

As mentioned above, a DNN architecture can be arranged such that the DNN mixer operates at an input of the DNN routine, and, according to other embodiments, the DNN architecture can be arranged such that the DNN mixer operates at an output of the DNN routine. According to yet another embodiment, a forecaster may include a DNN architecture where a first DNN mixer operates at an input of the routine and a second DNN mixer operates at an output of the routine. In this case, the DNN forecasters may be arranged in between the first and second DNN mixers. The input DNN mixer and the output DNN mixer in this architecture may have the same weights, or, in other embodiments, may have different weights.

DNN Mixer

The architecture of the DNN mixers 32, 52, 72, 82 in the various embodiments can be thought as a function that maps inputs to outputs. The function can be mathematically represented as: $(\hat{x}1, \hat{x}2, \ldots, \hat{x}L) = F(x_1, x_2, \ldots, x_k, \theta)$, where the input to the function is a set of k vectors $(x_1, x_2, \ldots, x_k)$ and the output is a set of L vectors $(x_1, x_2, \ldots, x_L)$. If the output of the mixer is a single time-series, L=1. The function is parametric in the sense that it takes as input a vector $\theta$ of n parameters, which specify how the function works.

The mixer function $F(x_1, x_2, \ldots, x_k, \theta)$ can be implemented with a deep neural network. In the neural network, the parameters $\theta$ are the weights assigned to the links between the neurons in the network, as described below with respect to FIGS. 8-10. The preferred DNN mixer architecture is a series of fully connected layers. Other possible DNN mixer architectures may include residual networks, recurrent neural network layers, auto-encoders, convolutional networks, or a combination of the layers of networks of those types. Some embodiments of various DNN mixers are described with respect to FIGS. 8-10.

As an example, the network may operate using a dense layer implementation. In this case, each layer may implement a set of numerical calculations, such as, for example, $x_{k+1} = \max(W_k x_k + b_k)$. From this notation, it may be understood that the calculations may include a set of recursive operations.

FIG. 8 is a functional block diagram of a DNN mixer 120 having a series of dense layers according to a first embodiment. The DNN mixer 120 may be considered to be a preferred embodiment. The DNN mixer 120 includes an input layer 122, a first dense layer 124, a second dense layer 126, and an output layer 128. The processing of the DNN mixer 120 includes a sequence of steps in which the results of one or more previous layers are embedded in one or more proceeding layers. Thus, the second dense layer 126 is based on the results of the input layer 122 and first dense layer 124 and provides results that are embedded in the output layer 128.

The optimization criteria can be changed in the DNN mixer 120 in some cases. For example, it may be advantageous to minimize the Mean Square Error (MSE) on a system to optimize the prediction. In other cases, this may not necessarily be the best way to optimize, and may include minimizing certain types of mapping, which can be a better criterion in some situations.

The DNN mixer 120 may receive an input into the input layer 122, where the input is from the forecasters (e.g., 76, 86, 94, 104, 112) in the output-mixer architecture. Each of the stages (i.e., 122, 124, 126, 128) may include any suitable algorithm, procedure, or routine. The DNN mixer 120 of FIG. 8 may be considered to be a preferred embodiment, where the DNN mixers 130, 140 of FIGS. 9 and 10 may also work sufficiently in many situations and may, in some cases, perform better than the mixer 120. FIGS. 9 and 10 may be generalized versions of more complicated mixers. Each block (i.e., 122, 124, 126, 128) of the DNN mixer 120 represents a function that incorporates the functions of the previous blocks. In some ways, the sequence may include a process of a daisy chain of functions embedded in each other.

In some case, some of the layers 122, 124, 126, 128 may include, at least partially, classical forecasting components (e.g., ARIMA) or modern forecasters (e.g., LSTM, ResNet, etc.). The ResNet forecasters are fairly new types of forecasters and may include features that are not publicly known.

FIG. 9 is a functional block diagram of a DNN mixer 130 having a residual network of dense layers, according to a second embodiment. The DNN mixer 130 of FIG. 9 includes an input layer 132, a first dense layer 134, a second dense layer 136, and an output layer 138. In addition to the sequential processing as is done with the DNN mixer 120 of FIG. 8, the DNN mixer 130 of FIG. 9 also includes a feedback process. The second dense layer 136 is configured to be based on the results of the input layer 132 and first dense layer 134 and also provides results in a feedback manner to the first dense layer 134. Thus, the first dense layer 134 is configured to be based on the results of the input layer 132 and results of the second dense layer 136.

FIG. 10 is a functional block diagram of a DNN mixer 140 having a mixed network, according to a third embodiment. The DNN mixer 140 includes an input layer 142, a convolution layer 144 representing a first processing layer, a dense layer 146 representing a second processing layer, and an output layer 148. The processing of the DNN mixer 140 includes a sequence of steps in which the results of one or more previous layers are embedded in one or more proceeding layers. Thus, the dense layer 146 is based on the results of the input layer 142 and convolution layer 144 and provides results that are embedded in the output layer 148.

The vector of parameter θ is set during the training of the monitored system (e.g., optical network). During the training, a dataset is fed into the system and the parameters θ are calculated iteratively using the stochastic gradient descent or other suitable procedures. It should be noted that the parameters θ may be specific to a dataset and are learned during the training procedure. It should also be noted that parameters θ can be trained independently of the parameters used in neural networks at the input or the output of the forecaster. In other words, the component forecasters used at the input or the output of the overall forecaster (e.g., input-mixer architecture shown in FIGS. 2A-2B and output-mixer architecture shown in FIGS. 3-7) can be trained on their own and their trained version can be used during the training of the mixer. The DNN mixers may therefore be configured to process the plurality of mixer inputs through a multi-layer DNN mixer architecture to find a non-linear transformation of the mixer inputs. The DNN mixers may be configured to combine multiple single-variate forecasts.

Figure 11:
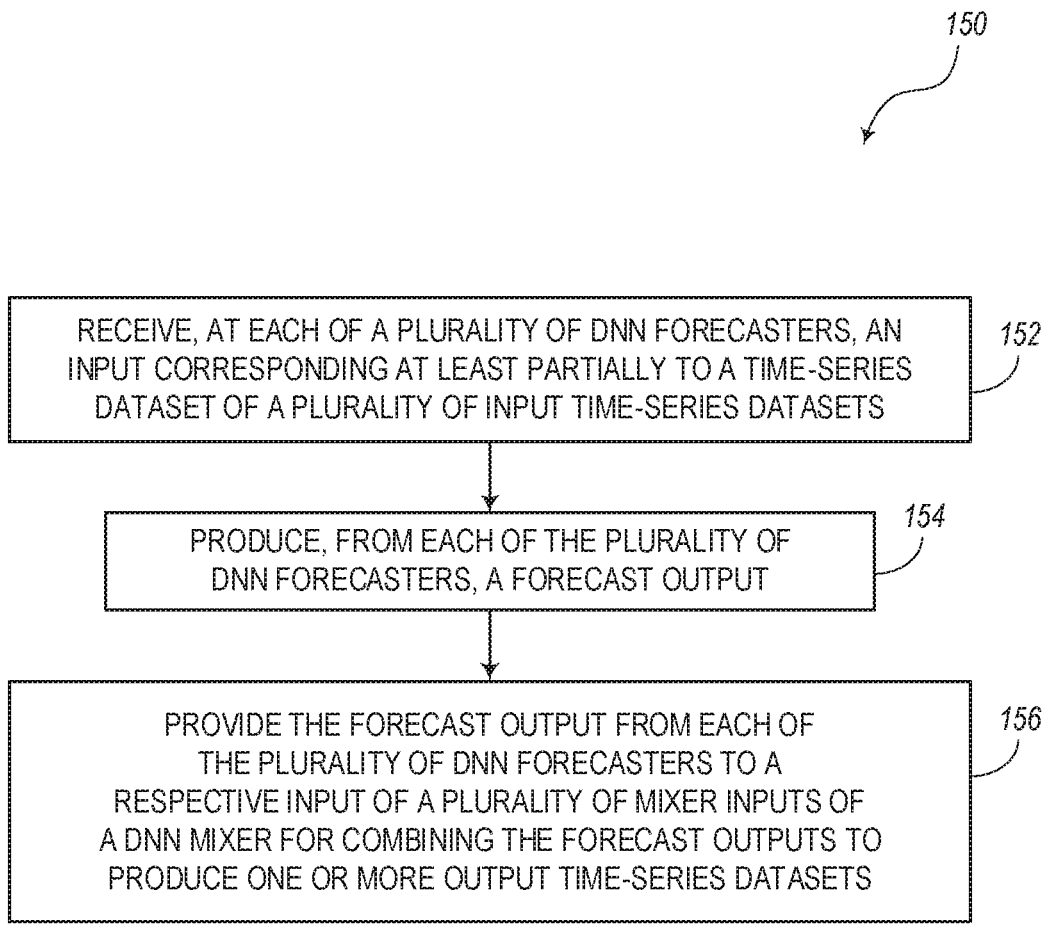
FIG. 11 is a flow diagram showing an embodiment of a method for predicting future data values of a system, according to various embodiments.

FIG. 11 is a block diagram showing an embodiment of a method 150 for predicting future values of a system. In this embodiment, the method 150 includes the step of receiving, at each of a plurality of Deep Neural Network (DNN) forecasters, an input corresponding to a time-series dataset of a plurality of input time-series datasets, as indicated in block 152. The method 150 also includes the step of producing, from each of the plurality of DNN forecasters, a forecast output, as indicated in block 154. The method 150 further includes providing the forecast output from each of the plurality of DNN forecasters to a respective input of a plurality of mixer inputs of a DNN mixer for combining the forecast outputs to produce one or more output time-series datasets, as indicated in block 156. The plurality of DNN forecasters and the DNN mixer mentioned in blocks 152, 154, 156 may be configured in software (e.g., DNN module 26) and may be executable by one or more processing devices (e.g., processing device 12). The method 150 may be executed with respect to an output-mixer architecture, such as one of the embodiments shown in FIGS. 3-7.

Removing Irrelevant Inputs from Forecaster

It may not always be clear which time-series should be input into the forecaster. In an optical network, for example, there may be thousands of correlated time-series to consider, but only a few which are strongly correlated to the time-series of interest. At the same time, there may be strongly correlated time-series among those time-series as well.

Therefore, it may be beneficial to remove the time-series which in effect add unnecessary repeated information to the forecaster. By removing superfluous time-series, the computation complexity of forecasting can be reduced. The removing process can be accomplished by procedures similar to "feature engineering," where, according to the present implementations, may be referred to as procedures for "time-series engineering" the forecaster. The forecasters can be trained with k time-series. Then, each time-series is removed, one-by-one, and the forecaster is trained with k−1 time-series. If the performance of the forecaster does not change when a specific time-series is removed, it means that this time-series is not necessary and can be left out of future forecasting procedures. In some embodiments, these procedures can be generalized to groups of time-series as well.

Benefits

One way to select the time-series in the input of the forecaster for forecasting a communication network or optical network is to use network inventory information. For example, a network operator may be interested in determining an end-to-end performance of a packet flow. Other time-series of interest may be the end-to-end flows, which may cross the shared links of the time-series of interest. Combined with the "time-series engineering" procedure, this could provide an automated way to select the best time-series for network forecasting based on network inventory information.

The embodiments of the present disclosure include features that are different from conventional forecasting systems and methods. For example, the present embodiments use a DNN based mixer in a DNN architecture applied to forecasting network time-series, whereby the input of the mixer can be one or more time-series summarizing historical time-series information or the input to the mixer can be one or more time-series of future time-series information.

Furthermore, the present embodiments are also considered to have novelty by using a hierarchical DNN architecture including multiple single-variate forecasters followed by a DNN mixer to forecast single-variate or multi-variate time-series from multi-variate input time-series. Also, the present embodiments are also considered to have novelty by using a hierarchical DNN including multiple single-variate forecasters followed by a DNN to forecast time-series, where some of the single-variate forecasters may include the forecaster disclosed in U.S. patent application Ser. No. 16/687,902.

Novelty can also be found by the process of training a hierarchical DNN including multiple single-variate forecasters followed by a DNN mixer with stochastic gradient descent, which minimizes the loss function of the network. This can be done by inputting multiple time-series to the network and determining the loss function from the output of the network and the time-series which is the target of the forecast.

The present embodiments may also be considered as novel in that they include the process of iterating over the input time-series and evaluating each time-series contribution to the forecast. Then, the embodiments may include the process of eliminating the time-series whose contribution to the forecast is below some threshold.

In some cases, a network operator may examine an Open Neural Network eXchange (ONNX) file of a network created after training using any of the embodiments described in the present disclosure. If an ONNX file is not provided (e.g., through an "inference service"), the network operator may be able to trace a series of function calls on tensors in a GPU of a Network Management System (NMS) to see how the forward pass in the network is accomplished or how it corresponds to the architecture. In this way, the embodiments of the present disclosure can be observed as being operational in a network.

According to other ways of detecting the embodiments in use, forecasting software (e.g., DNN module 26) may be accompanied with detailed explanations of how to run the software, how to set it up, an explanation of how and why it works, etc., which may be provided in an operator's manual. Also, a test using multiple time-series can be performed to check if all time-series are being used in the training of the forecaster or if only some of them are used, which may be an indication that some time-series have been removed according to the removing procedures mentioned above when used in training the system. In addition, other parallel implementations of multi-variate forecaster may be detected to see if multiple single-variate forecasters are used according to the explanations of the embodiments of the present disclosure.

The DNN module 26 can be implemented in various forecasting products and may be included in the development of common sets of libraries and services that may become a part of standard product lines. Embodiments of the DNN module 26 may be incorporated into various standards, such as Acumos, ITU-T, 3GPP, etc.

Testing Performance of DNN Routines

By implementing the DNN systems and methods described herein, various benefits may be realized in the field of forecasting. When compared with conventional forecasting techniques, the embodiments described herein can provide significant gain. When the present forecasting techniques were tested with conventional techniques (e.g., single-variate ResNet forecasters, single-variate LSTM forecasters, multi-variate LSTM forecasters, which use multiple LSTM forecasters and combines their outputs using VAR), the input-mixer architecture with multiple LSTM single-variate forecasters, the output-mixer architecture with multiple LSTM single-variate forecasters, and the output-mixer architecture with multiple ResNet single-variate forecaster show significant improvement.

In the test, two network datasets were used to evaluate the performance of the various multi-variate forecasting architectures. A set of optical measurements from a Service Provider included several optical measurements taken in parallel, where the target forecast is for Q-factor. Also, a set of optical measurements from a web provider include several optical measurements taken in parallel, again where the target forecast is for Q-factor.

The SMAPE measure indicates a relative error of predicted values over forecasted values. During the tests, the single-variate ResNet showed to be the best single-variate forecaster and may be used as a benchmark. Neither the single-variate LSTM forecaster nor the multi-variate LSTM forecaster using the VAR output performed as well as the ResNet forecaster. Also, the output-mixer architecture outperformed the input-mixer architecture and provided an improvement in the range from 14% to 68% in SMAPE metric over the single-variate ResNet forecaster. Interestingly, the performance of the LSTM forecaster in the output-mixer architecture was found to be better than the performance of the ResNet forecaster in the output-mixer architecture, even though the single-variate ResNet mixer performed much better than the single-variate LSTM forecaster.

The relative performance of the output-mixer ResNet technique and the output-mixer LSTM technique was found to be about the same when using networking datasets, but the output-mixer LSTM architecture appeared to have a better performance on these datasets as well. The test results also reveal that although the datasets were a bit more challenging, the forecasters showed a reduction in the error metric (i.e., SMAPE) in some cases from 21% to 10%.

The contents of this disclosure may represent a set of key algorithms in this software, which may be included in application servers, cloud-based systems, supply management software for sales forecasting, and other various servers, systems, networks. Network equipment providers with an NMS may incorporate the forecasting techniques described in the present disclosure for planning tools, orchestrators, or forecasting service (e.g., forecasting as a service). In some cases, the forecasters may be included in databases. The forecasters described herein may also be applicable in other industries or environments, such as demand forecasting in supply management, sales, trading stocks, health care, etc. In some Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A non-transitory computer-readable medium configured to store computer logic having instructions that, when executed, cause one or more processing devices to
    receive, at each of a plurality of Deep Neural Network (DNN) forecasters, an input corresponding at least partially to a time-series dataset of a plurality of input time-series datasets obtained from an optical network,
    produce, from each of the plurality of DNN forecasters, a forecast output,
    provide the forecast output from each of the plurality of DNN forecasters to a respective input of a plurality of mixer inputs of a DNN mixer for combining the forecast outputs to produce one or more output time-series datasets,
    wherein the plurality of DNN forecasters and the DNN mixer are configured in software and are executable by the one or more processing devices, and
    utilize the one or more output time-series datasets to perform one or more of
        predicting performance of data packets on multiple links,
        predicting when a link will exceed a capacity threshold,
        predicting Signal to Noise Ratio (SNR) on a fiber of an optical network,
        predicting long-term quality factor of a wave, and
        predicting Signal to Interference-plus-Noise Ratio (SINR) of waves on an optical submarine link.

2. The non-transitory computer-readable medium of claim 1, wherein the plurality of DNN forecasters includes forecasters selected from the group consisting of ResNet forecasters and Long Short-Term Memory (LSTM) forecasters.

3. The non-transitory computer-readable medium of claim 1, wherein the DNN mixer utilizes a multi-layer architecture and is configured to apply different weights to the plurality of mixer inputs to find a non-linear transformation of the mixer inputs.

4. An apparatus comprising
a processing device, and
a memory device configured to store a Deep Neural Network (DNN) module having instructions that, when executed, cause the processing device to
receive an input at each of one or more DNN forecasters, each input corresponding at least partially to one or more time-series datasets of a plurality of input time-series datasets and to produce a forecast output corresponding at least partially to one or more output time-series datasets, wherein the plurality of input time-series datasets are related to multiple types of parameters of an optical network, and
receive a plurality of mixer inputs at a DNN mixer, combine the plurality of mixer inputs, and produce a mixer output, the DNN mixer configured for one or more of
receiving the forecast output from each of the one or more DNN forecasters at a respective input of the plurality of mixer inputs for producing the one or more output time-series datasets, and
receiving the plurality of input time-series datasets for producing an input to the one or more DNN forecasters,
wherein the one or more DNN forecasters and the DNN mixer are configured in software and are executable by the processing device.

5. The apparatus of claim 4, further comprising a plurality of DNN forecasters.

6. The apparatus of claim 5, wherein the apparatus is arranged in an output-mixer configuration where the plurality of DNN forecasters are each configured for receiving one time-series dataset of the plurality of input time-series datasets and the DNN mixer is configured for receiving the forecast output from each of the plurality of DNN forecasters.

7. The apparatus of claim 5, wherein the plurality of DNN forecasters includes forecasters selected from the group consisting of ResNet forecasters and Long Short-Term Memory (LSTM) forecasters.

8. The apparatus of claim 7, wherein the DNN mixer includes a trend DNN mixer, a seasonality DNN mixer, and an adder.

9. The apparatus of claim 4, wherein the DNN mixer processes the plurality of mixer inputs through a multi-layer DNN mixer architecture to find a non-linear transformation of the mixer inputs.

10. The apparatus of claim 4, wherein the forecast output produced by each of the one or more DNN forecasters includes a prediction of future values.

11. The apparatus of claim 4, wherein the one or more output time-series datasets enable the performance of one or more functions selected from the group of functions consisting of
predicting performance of data packets on multiple links,
predicting when a link will exceed a capacity threshold,
predicting Signal to Noise Ratio (SNR) on a fiber of an optical network,
predicting long-term quality factor of a wave, and
predicting Signal to Interference-plus-Noise Ratio (SINK) of waves on an optical submarine link.

12. The apparatus of claim 4, wherein the one or more output time-series datasets include types of parameters that are different from the types of parameters of one or more of the plurality of input time-series datasets.

13. The apparatus of claim 12, wherein the DNN mixer is configured to combine multiple single-variate forecasts.

14. An apparatus comprising
a processing device, and
a memory device configured to store a Deep Neural Network (DNN) module having instructions that, when executed, cause the processing device to
receive an input at each of one or more DNN forecasters, each input corresponding at least partially to one or more time-series datasets of a plurality of input time-series datasets and to produce a forecast output corresponding at least partially to one or more output time-series datasets, wherein the one or more output time-series datasets include types of parameters that are different from the types of parameters of one or more of the plurality of input time-series datasets, and
receive a plurality of mixer inputs at a DNN mixer, combine the plurality of mixer inputs, and produce a mixer output, the DNN mixer configured for one or more of
receiving the forecast output from each of the one or more DNN forecasters at a respective input of the plurality of mixer inputs for producing the one or more output time-series datasets, and
receiving the plurality of input time-series datasets for producing an input to the one or more DNN forecasters,
wherein the one or more DNN forecasters and the DNN mixer are configured in software and are executable by the processing device.

15. The apparatus of claim 14, further comprising a plurality of DNN forecasters.

16. The apparatus of claim 15, wherein the apparatus is arranged in an output-mixer configuration where the plurality of DNN forecasters are each configured for receiving one time-series dataset of the plurality of input time-series datasets and the DNN mixer is configured for receiving the forecast output from each of the plurality of DNN forecasters.

17. The apparatus of claim 14, wherein the plurality of DNN forecasters includes forecasters selected from the group consisting of ResNet forecasters and Long Short-Term Memory (LSTM) forecasters.

18. The apparatus of claim 17, wherein the DNN mixer includes a trend DNN mixer, a seasonality DNN mixer, and an adder.

19. The apparatus of claim 14, wherein the DNN mixer processes the plurality of mixer inputs through a multi-layer DNN mixer architecture to find a non-linear transformation of the mixer inputs.

20. The apparatus of claim 14, wherein the forecast output produced by each of the one or more DNN forecasters includes a prediction of future values.

* * * * *